US009469553B2

(12) United States Patent
Irvin, Sr.

(10) Patent No.: US 9,469,553 B2
(45) Date of Patent: Oct. 18, 2016

(54) RETROFIT ATTACHMENTS FOR WATER TREATMENT SYSTEMS

(75) Inventor: Whitaker B. Irvin, Sr., Sandy, UT (US)

(73) Assignee: QWTIP, LLC, Park City, UT (US)

( * ) Notice: Subject to any disclaimer, the term of this patent is extended or adjusted under 35 U.S.C. 154(b) by 44 days.

(21) Appl. No.: 14/240,397

(22) PCT Filed: Aug. 24, 2012

(86) PCT No.: PCT/US2012/052367
§ 371 (c)(1),
(2), (4) Date: Feb. 23, 2014

(87) PCT Pub. No.: WO2013/029016
PCT Pub. Date: Feb. 28, 2013

(65) Prior Publication Data
US 2014/0209535 A1    Jul. 31, 2014

Related U.S. Application Data

(60) Provisional application No. 61/526,834, filed on Aug. 24, 2011, provisional application No. 61/604,502, filed on Feb. 28, 2012.

(51) Int. Cl.
*B01D 21/24* (2006.01)
*B01D 21/26* (2006.01)
*C02F 1/38* (2006.01)

(52) U.S. Cl.
CPC ............. *C02F 1/38* (2013.01); *B01D 21/2411* (2013.01); *B01D 21/262* (2013.01); *B01D 21/267* (2013.01); *C02F 2201/002* (2013.01); *C02F 2201/005* (2013.01)

(58) Field of Classification Search
CPC .............. B01D 21/262; B01D 21/267; B01D 21/2411; C02F 1/38
See application file for complete search history.

(56) References Cited

U.S. PATENT DOCUMENTS

| | | |
|---|---|---|
| 699,636 A | 5/1902 | Thrupp |
| 1,061,206 A | 5/1913 | Tesla |
| 2,601,519 A | 6/1952 | Hardy et al. |
| 3,487,784 A | 1/1970 | Rafferty et al. |
| 3,632,221 A | 1/1972 | Uehling |
| 3,731,800 A | 5/1973 | Timson |
| 4,042,351 A | 8/1977 | Anderson |

(Continued)

FOREIGN PATENT DOCUMENTS

| | | |
|---|---|---|
| AT | 196680 | 3/1958 |
| EP | 1770717 A1 | 4/2007 |

(Continued)

OTHER PUBLICATIONS

The Written Opinion for PCT/US2012/052367, dated Feb. 2013.*

(Continued)

*Primary Examiner* — David A Reifsnyder
(74) *Attorney, Agent, or Firm* — Cahn & Samuels, LLP

(57) ABSTRACT

In at least one embodiment, the invention provides a retrofit for existing water treatment systems where the retrofit includes at least one of the following: a particulate separator, a supplementary inlet, and a waveform disk-pack turbine. In a further embodiment, the invention includes a water treatment system combined with at least one of the following: a particulate separator, a supplementary inlet, and a waveform disk-pack turbine.

20 Claims, 12 Drawing Sheets

(56) References Cited

U.S. PATENT DOCUMENTS

| | | | |
|---|---|---|---|
| 4,118,207 A * | 10/1978 | Wilhelm | B01D 45/14 55/338 |
| 4,361,490 A | 11/1982 | Saget | |
| 5,215,501 A | 6/1993 | Ushikoshi | |
| 5,248,238 A | 9/1993 | Ishida et al. | |
| 5,254,250 A | 10/1993 | Rolchigo et al. | |
| 5,498,329 A | 3/1996 | Lamminen et al. | |
| 5,778,696 A | 7/1998 | Conner | |
| 6,116,430 A | 9/2000 | Horton | |
| 6,227,795 B1 | 5/2001 | Schmoll, III | |
| 6,328,527 B1 * | 12/2001 | Conrad | B01D 45/14 415/90 |
| 6,719,817 B1 | 4/2004 | Marin | |
| 6,873,235 B2 | 3/2005 | Fiske | |
| 6,890,443 B2 | 5/2005 | Adams | |
| 7,074,008 B2 | 7/2006 | Motonaka | |
| 7,341,424 B2 | 3/2008 | Dial | |
| 7,462,945 B2 * | 12/2008 | Baarman | C02F 1/325 290/43 |
| 7,489,060 B2 | 2/2009 | Qu et al. | |
| 8,623,212 B2 * | 1/2014 | Irvin, Sr. | B01D 21/262 210/330 |
| 8,636,910 B2 * | 1/2014 | Irvin, Sr. | B01D 21/262 210/780 |
| 2004/0009063 A1 | 1/2004 | Polacsek | |
| 2004/0107681 A1 * | 6/2004 | Carlsson | B01D 45/14 55/406 |
| 2004/0159085 A1 | 8/2004 | Carlsson et al. | |
| 2006/0000383 A1 | 1/2006 | Nast | |
| 2006/0054549 A1 | 3/2006 | Schoendorfer | |
| 2006/0233647 A1 | 10/2006 | Saunders | |
| 2006/0272624 A1 | 12/2006 | Pettersson | |
| 2007/0089636 A1 | 4/2007 | Guardo, Jr. | |
| 2007/0144956 A1 | 6/2007 | Park et al. | |
| 2008/0067813 A1 | 3/2008 | Baarman et al. | |
| 2008/0168899 A1 | 7/2008 | Decker | |
| 2009/0078150 A1 | 3/2009 | Hasegawa et al. | |
| 2009/0314161 A1 | 12/2009 | Al-Alusi et al. | |
| 2010/0107647 A1 | 5/2010 | Bergen | |
| 2010/0180854 A1 | 7/2010 | Baumann et al. | |
| 2011/0038707 A1 * | 2/2011 | Blackstone | F04D 17/161 415/90 |
| 2011/0266811 A1 | 11/2011 | Smadja | |
| 2012/0051908 A1 | 3/2012 | Irvin, Sr. | |
| 2014/0070541 A1 | 3/2014 | Irvin, Sr. | |
| 2014/0183144 A1 | 7/2014 | Irvin, Sr. | |
| 2014/0224722 A1 | 8/2014 | Irvin, Sr. | |
| 2015/0144478 A1 | 5/2015 | Irvin, Sr. | |

FOREIGN PATENT DOCUMENTS

| | | |
|---|---|---|
| GB | 1187632 | 4/1970 |
| GB | 1262961 | 2/1972 |
| JP | 2009293984 A | 11/2009 |
| WO | 2004112938 A1 | 12/2004 |
| WO | 2008054131 A1 | 5/2008 |
| WO | 2009024154 A1 | 2/2009 |

OTHER PUBLICATIONS

Coats, Callum, "Living Energies," 2001, pp. 107-117, 156-192, 197-200, and 275-293.

Schauberger, Viktor, translated and edited by Callum Coats, "The Energy Evolution: Harnessing Free Energy from Nature," vol. 4 of the Eco-Technology Series, Mar. 2001, pp. 9-28, 62-63, 104-113, 130-142, 164-195, and 200-203.

Schauberger, Viktor, translated and edited by Callum Coats, "The Fertile Earth: Nature's Energies in Agriculture, Soil Fertilisation and Forestry," Volume Three of Eco-Technology Series, Mar. 2001, pp. 26-29, 39-43, 48-50, 57-68, and 72-74.

GuardianTrader, Genesis Vortex, http://guardiantrader.com/Genesis_Vortex.html, printed Jul. 12, 2011.

Natural Energy Works, "Wasserwirbler (Water Vortex Shower)", http://www.orgonclab.org/cart/yvortex.htm, printed Jul. 12, 2011.

Wikipedia, "Tesla Turbine," http://en.wikipedia.org/wik/Tesla_turbine, printed Mar. 23, 2010.

Jens Fischer, "Original Martin-Wirbelwasser", http://fischer-wirbelwasser.de/Schauberger/schauberger.html, printed Jul. 12, 2011.

Wirbelwasser, "Was ist Wirbelwasser?", http://fischer-wirbelwasser.de/Wasserwirbler/Was_ist_Wirbelwasser/body_was_ist_wirbelwasser.html, printed Jul. 12, 2011.

Espacenet, English Abstract for JP2009293984 (A), printed Mar. 14, 2013.

Fractal Water, LLC, "Structured water is Fractal Water's Implosion nozzle Vortex", copyrighted 2012, printed on Dec. 28, 2012 from http://www.fractalwater.com/vortex/.

Fractal Water, LLC, "Magnetic Water Treatment with the Fractal Water Super Imploder Magnetics", copyrighted 2012, printed on Dec. 28, 2012 from http://www.fractalwater.com/magnetics/.

Fractal Water, LLC, "Fractal Water: Vortex Magnetic Systems:: Physics of the Imploder Vortex Nozzle", copyrighted 2012, printed on Dec. 28, 2012 from http://www.fractalwater.com/science/physics-of-the-imploder-vortex-nozzle/.

Fractal Water, LLC, "Buy the Super Imploder from Fractal Water, Vortex Magnetic System", copyrighted 2012, printed on Dec. 28, 2012 from http://www.fractalwater.com/products/imploder-magnetic-water/.

Fractal Water, LLC, "Implosion water structured vortex", copyrighted 2012, printed on Dec. 28, 2012 from http://www.fractalwater.com/products/tri-ploder-vortex/.

Fractal Water, LLC, "Fractal Water: Vortex Magnetic Systems :: Imploder Vortex Shower Head", copyrighted 2012, printed on Dec. 28, 2012 from http://www.fractalwater.com/products/imploder-vortex-shower-head/.

* cited by examiner

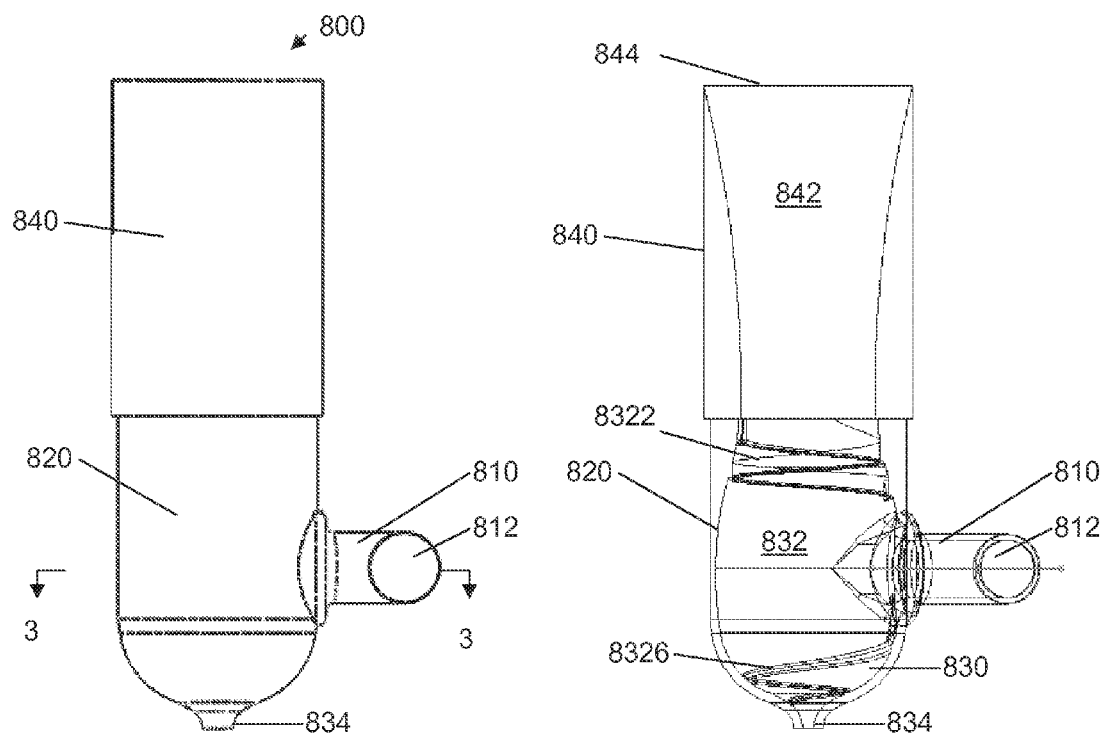
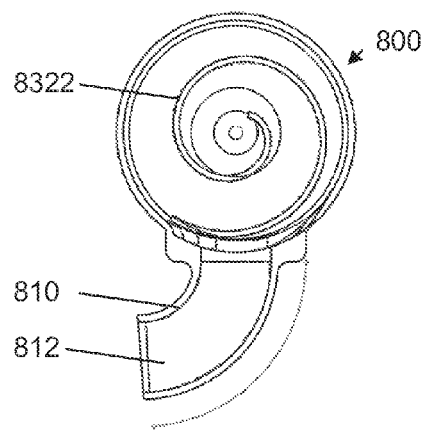

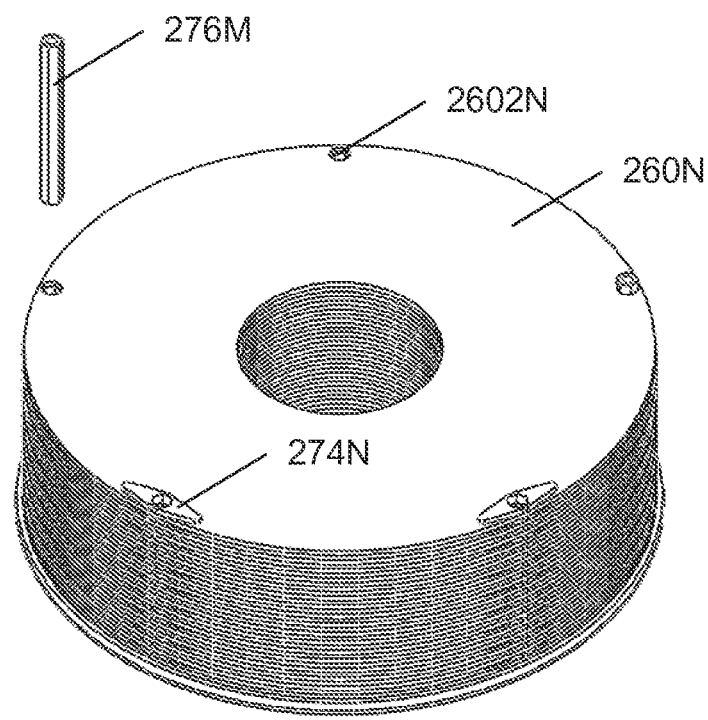
FIG. 17A
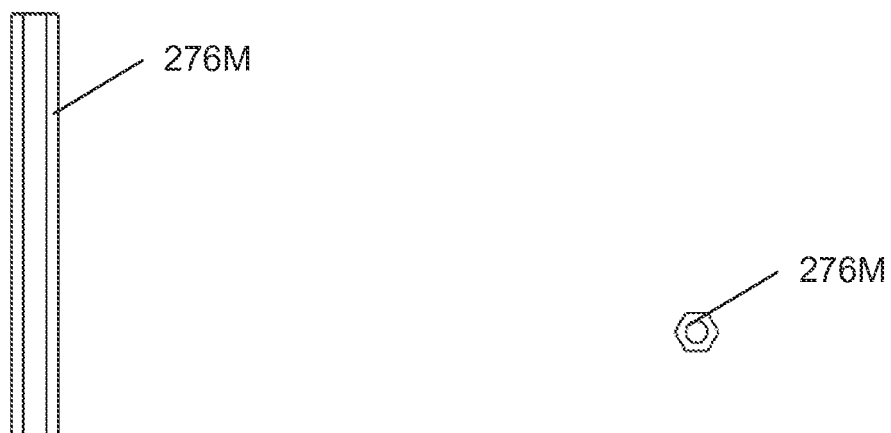
FIG. 17B
FIG. 17C

RETROFIT ATTACHMENTS FOR WATER TREATMENT SYSTEMS

This application claims the benefit of U.S. provisional Application Ser. No. 61/526,834, filed Aug. 24, 2011 entitled "Water Treatment System and Method for Use in Storage Containers" and U.S. provisional Application Ser. No. 61/604,502, filed Feb. 28, 2012 entitled "Retrofit Attachments for Water Treatment Systems", which are both hereby incorporated by reference.

I. FIELD OF THE INVENTION

This invention in at least one embodiment relates to an improvement and/or add-on for water systems having at least one discharge port in fluid communication with a chamber housing a disk-pack. In a further embodiment, the invention relates to the resulting possible combinations.

II. SUMMARY OF THE INVENTION

The invention provides in a first embodiment a system for attaching to a device having an accumulation chamber with at least one discharge port and a disk-pack such that a fluid pathway exists from a center of the disk-pack through the disk-pack into the accumulation chamber and onto the at least one discharge port, the system including a connection member having a passageway capable of being in fluid communication with the discharge port, a discharge module having a discharge chamber in fluid communication with the passageway, and a particulate discharge port in fluid communication with the discharge chamber. The invention provides in a second embodiment a water treatment system including a motor; a driveshaft engaging the motor; a vortex module having a housing, a plurality of inlets spaced around the periphery of the housing near a top of the housing, and a vortex chamber formed in the housing and in fluid communication with the plurality of inlets; a disk-pack module having a housing having a accumulation chamber formed in the disk-pack housing, and the accumulation chamber having a plurality of discharge ports providing a fluid pathway from the accumulation chamber to outside of the disk-pack housing, and a disk-pack having an expansion chamber formed in an axial center and in fluid communication with the vortex chamber, the disk-pack having a plurality of spaced apart disks providing chambers between them to form a plurality of passageways between the expansion chamber and the accumulation chamber, the disk-pack engaging the driveshaft; and a particulate separator including a connection member having a passageway capable of being in fluid communication with the discharge port, a discharge module having a discharge chamber in fluid communication with the passageway, and a particulate discharge port in fluid communication with the discharge chamber. The invention provides in a modification to the system of the second embodiment a system further including an intake module having a intake housing with at least one intake opening passing through it into an intake chamber formed in the intake housing, and a plurality of ports in fluid communication with the intake chamber, each of the plurality of ports is in fluid communication with one inlet of the vortex module.

The invention provides a third embodiment to any of the previous embodiments where the system further includes a second discharge module having a second discharge chamber in fluid communication with the discharge chamber and/or a discharge outlet in fluid communication with the second discharge chamber. The invention provides a fourth embodiment to the third embodiment where the second discharge module rises above a height of the attached device. The invention provides a fourth embodiment to any of the previous embodiments where the discharge module includes at least one spiraling protrusion along a surface of the discharge chamber running from proximate to a junction of the passageway and the discharge chamber. The invention provides a modification to the fourth embodiment where the spiraling protrusion runs in an upwardly direction towards the discharge outlet and/or the spiraling protrusion runs in a downwardly direction from proximate to the junction towards the particulate discharge port. The invention provides a further modification to the previous embodiment where the spiraling protrusion runs along a surface of the second discharge chamber. The invention provides a further modification to the fourth embodiment and its modifications where the at least one of the at least one spiraling protrusion spirals in a counterclockwise direction when viewed from above and/or the at least one of the at least one spiraling protrusion spirals in a clockwise direction when viewed from above. The invention provides a fifth embodiment to any of the previous embodiments where the connection member is adapted to attach to the device to provide a smooth fluid flow from the discharge port to the passageway. The invention provides a sixth embodiment to any of the previous embodiments where the system further includes a supplementary inlet capable of attaching to a second discharge port of the device. The invention provides a modification to the sixth embodiment where the supplementary inlet includes an inlet passageway, and a valve within the inlet passageway to control a flow of fluid through the inlet passageway. The invention provides a modification to the sixth embodiment or its modification where the supplementary inlet includes a manual controlled valve and/or an electrically controlled valve.

The invention provides in a seventh embodiment a disk-pack turbine including a top rotor having an axially centered opening passing therethrough, a plurality of disks having a substantially even thickness throughout that has a thickness as discussed in this disclosure and at least two waveforms present on each disk, each disk having an axially centered opening passing therethrough, a bottom rotor axially centered with the top rotor and the plurality of disks, and at least one connection component connecting the top rotor, the plurality of disks and the bottom rotor. The invention provides an eighth embodiment to the seventh embodiment where each of the disks is stamped metal. The invention provides a ninth embodiment to either of the previous embodiments where the at least two waveform is selected from a group consisting of circular, sinusoidal, biaxial, biaxial sinucircular, a series of interconnected scallop shapes, a series of interconnected arcuate forms, hyperbolic, and/or multi-axial including combinations of these. The invention provides a tenth embodiment to any of the seventh through ninth embodiments where the at least two waveforms are formed by a plurality of ridges (or protrusions or rising waveforms), grooves, and depressions (or descending waveforms) in the waveform surface including the features having different heights and/or depths compared to other features and/or along the individual features. The invention provides a eleventh embodiment to any of the other embodiments in this paragraph where the plurality of disks define at least one disk chamber through which fluid is capable of passing from the axially centered opening to a periphery of the disks. The invention provides a twelfth embodiment to any of the other embodiments in this paragraph where the plurality of openings defines an expansion chamber. The invention provides a thirteenth embodiment to any of the other embodiments in this paragraph where the top rotor is capable of fluid engagement or communication with a vortex chamber of a device into which the disk-pack turbine is installed. The invention provides a fourteenth embodiment to any of the other embodiments in this paragraph where the disk-pack turbine further includes a plurality of spacers each having a hexagonal opening passing therethrough, and wherein each of the at least one connection component is a hexagonal support member that passes through a respective hexagonal opening present in each disk and at least one spacer between neighboring disks.

The invention in a further embodiment includes the modes of operation of the above-described embodiments.

Given the following enabling description of the drawings, the system should become evident to a person of ordinary skill in the art.

III. BRIEF DESCRIPTION OF THE DRAWINGS

The present invention is described with reference to the accompanying drawings. In the drawings, like reference numbers indicate identical or functionally similar elements. The use of cross-hatching (or lack thereof) and shading within the drawings is not intended as limiting the type of materials that may be used to manufacture the invention.

FIGS. 1-6 illustrate a variety of views of a particulate separator embodiment according to the invention. FIGS. 2 and 6 illustrate transparent views of the particulate separator embodiment.

FIG. 17A illustrates an alternative wing shim embodiment installed in a partial disk-pack.

FIG. 17B illustrates a side view of a support member of the wing shim illustrated in FIG. 17A. FIG. 17C illustrates a top view of a support member of the wing shim illustrated in FIG. 17A.

IV. DETAILED DESCRIPTION OF THE DRAWINGS

Figure 4:
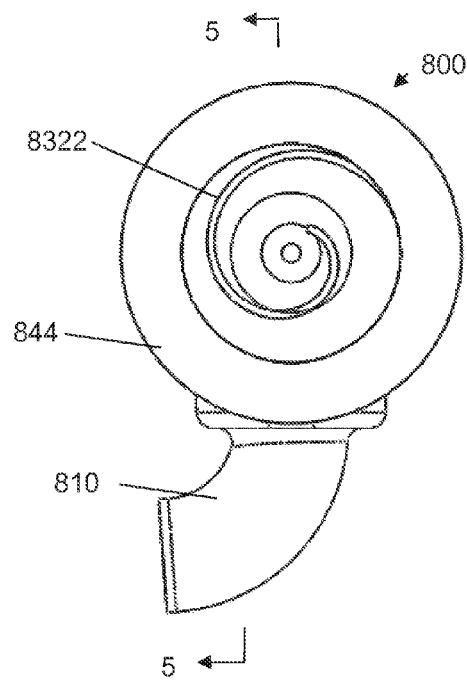

The figures illustrate example embodiments according to the invention. The illustrated embodiments are for attachment to a system treating water contained in a storage container (or vessel). In at least one further embodiment, the system includes a water treatment system with one or more of the attachments attached to it. Although the non-limiting embodiments described herein are directed at water, water should be understood as an example of a fluid, which covers both liquids and gases capable of flowing through a system.

The water treatment systems in at least one embodiment are placed into a vessel (or storage container or water source or environment). As used in this disclosure, "vessel", for example, includes jars, bowls, buckets, containers, tanks, swimming pools, fountains, stream-fed vernal ponds, ponds, canals, streams, rivers, domestic water wells, irrigation ditches, irrigation reservoirs, evaporative air conditioning systems, and industrial process water systems. In other embodiments, the water treatment system discharges the fluid into a second vessel. In further embodiments, the water treatment system pulls fluid from a vessel via conduit or other passageways and/or discharges through addition conduit or other passageways back to the source vessel. The water treatment systems in at least one embodiment are for treating water that is relatively free of debris such as water present in water storage containers and systems, pools, industrial process systems, cooling towers and systems, municipal and/or tanker supplied water, and well water. The various vessels, containers, and arrangements are examples of environments from which water can be drawn.

FIGS. 1-8 illustrate an example embodiment according to the invention. The illustrated embodiment is for attachments to a water treatment system 85 (see, e.g., FIGS. 10A-11) having a chamber housing a disk-pack turbine having a plurality of disks capable of spinning within the chamber and where the chamber includes at least two discharge ports. U.S. patent application Ser. No. 13/213,614 published as U.S. Pat. No. 8,636,910 provides examples of such water treatment systems and is hereby incorporated by reference for those teachings. The attachments include a particulate separator with or without a particulate collection container and/or a supplemental port with a valve. As used in this disclosure, particulate includes, for example, particulate, precipitated matter and/or concentrated solids or other similar material discharged from a separation process that is capable of flowing through a conduit.

The water treatment systems 85 include a disk-pack turbine having a plurality of disks contained in it and the disks and/or rotors define an expansion chamber axially centered in the disk-pack turbine. Water enters into the disk-pack turbine through at least in part the expansion chamber before flowing out between the disks and/or rotors into an accumulation chamber defined by a housing. The disk-pack turbine rotates within the accumulation chamber. The accumulation chamber gathers the water after it has passed through the disk-pack turbine. The highly energetic water smoothly transitions to be discharged at low pressure and velocity through at least one discharge port 232 extending away from the accumulation chamber. In at least one embodiment, a particulate separator is attached to at least one discharge port 232 to allow water to flow from the discharge port 232 through the particulate separator into the environment from which the water was taken.

Figure 20A:
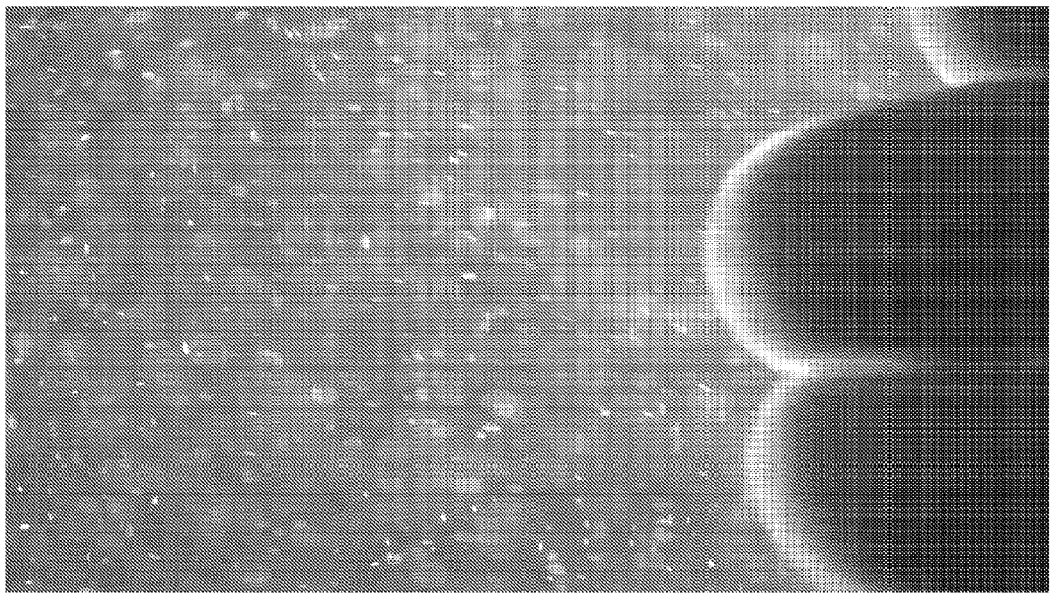
FIGS. 20A and 20B depict images of the water after it exits the discharge outlet of a prototype built according to at least one embodiment of the invention.
Figure 20B:
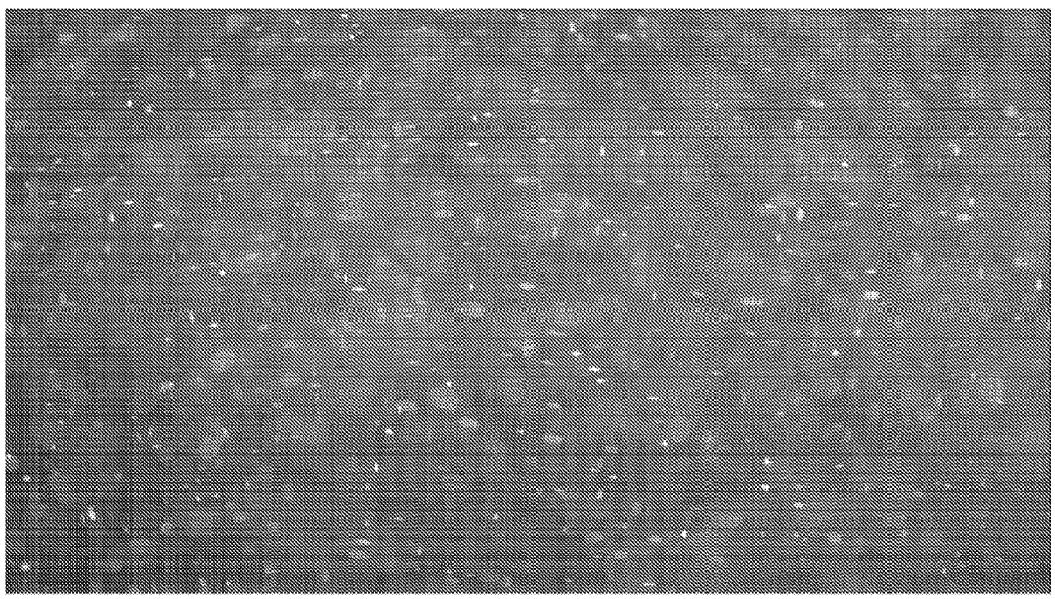

FIGS. 1-8 illustrate an example of a particulate separator and discharge enhancer (or particulate separator) 800 that includes a connection member 810 having a passageway 812 running from its free end into a housing 820 having a discharge module 830 and an optional second discharge module 840. In at least one alternative embodiment as illustrated, the discharge module 830 and the second discharge module 840 are integrally formed together the housing 820 that defines an expanding diameter cavity for discharging the water from the system. In at least one embodiment, the particulate separator 800 further augments the spin and rotation of the water being discharged as the water moves upwards in an approximately egg-shaped compartment. In at least one embodiment, the shape of the discharge chamber 832 facilitates the creation of a vortex exit flow for material out through the particulate discharge port 834 and a vortex exit flow for the water out through the discharge outlet 844 forming multiple vortical solitons that float up and away from the discharge outlet 844 spinning and in many cases maintaining a relative minimum distance amongst themselves as illustrated in FIGS. 20A and 20B. The vortical solitons in this embodiment continue in motion in the container in which they are discharged until they are interrupted by another object.

Figure 11:
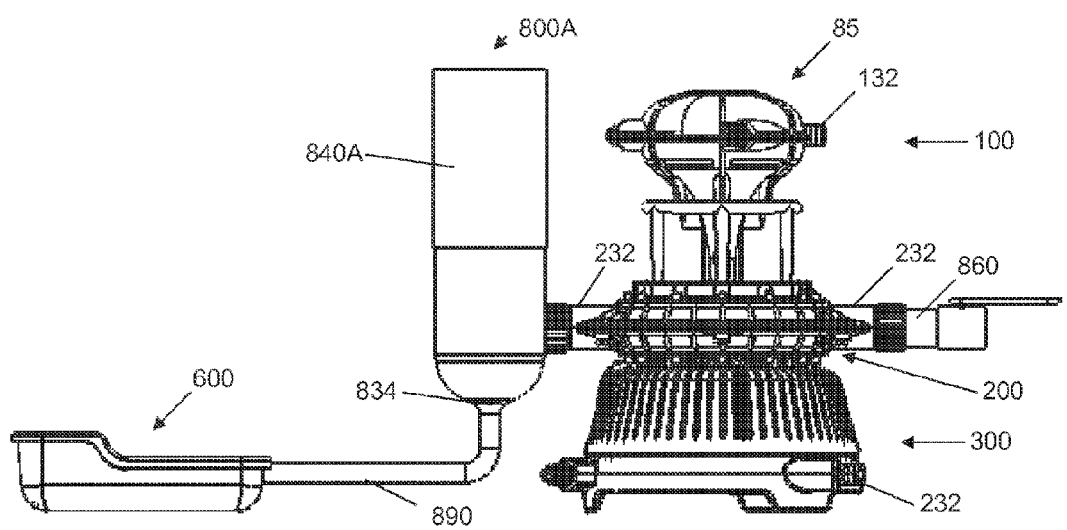
FIGS. 10A-11 illustrate particulate separator embodiments attached to water treatment systems according to the invention.
Figure 10A:
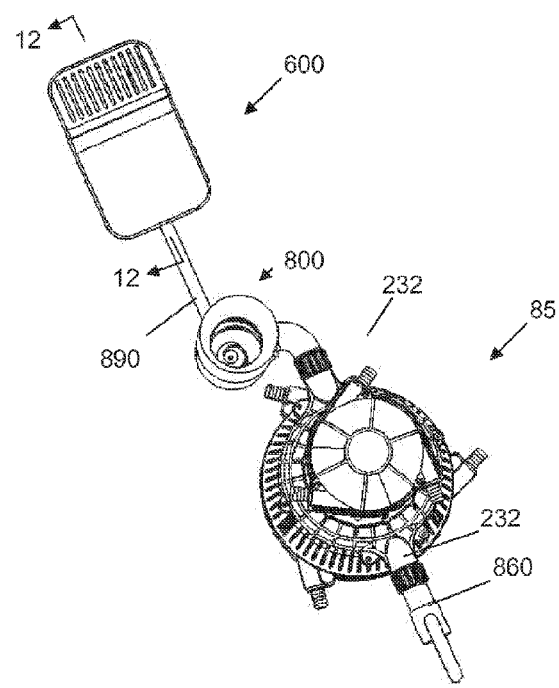

The connection member 810 connects to the existing discharge port 232 of the water treatment system through, for example, press-fit, adhesive, screw engagement, and clamped engagement to establish a fluid pathway from the accumulation chamber into the housing 820. FIGS. 10A-11 illustrate an example of the particulate separator 800 attached to a water treatment system 85. In an alternative embodiment, an adaptor is used to provide the connection between the discharge port 232 and the particulate separator 800, which in at least one embodiment provides a substantially smooth passageway from the accumulation chamber of the water treatment system 85 into the connection member 810 to minimize the creation of extraneous turbulence. The connection member 810 in at least one embodiment includes a threaded end for securing a collar to it for attachment to a water treatment system. In at least one embodiment, the member used to attach the connection member 810 to the water treatment system also provides a smooth transition to change the cross-section of the overall passageway from the discharge port 232 to the passageway 812.

Figure 5:
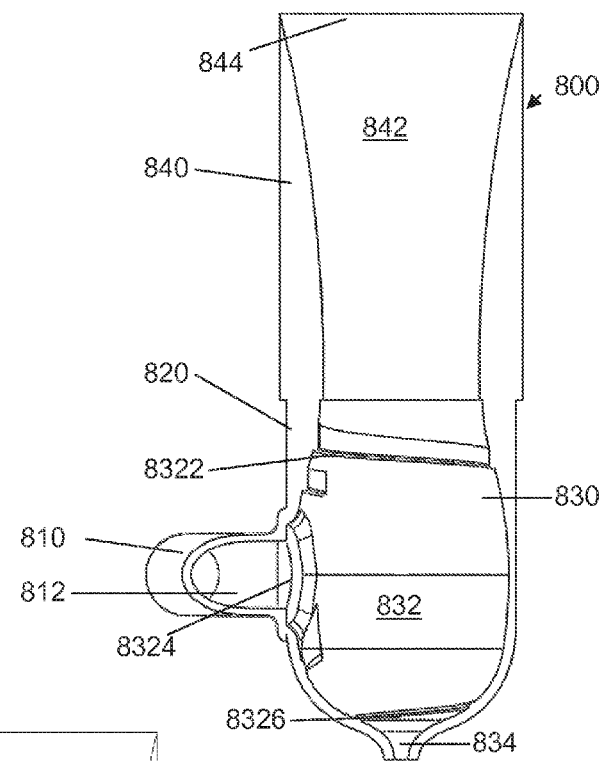
Figure 9:
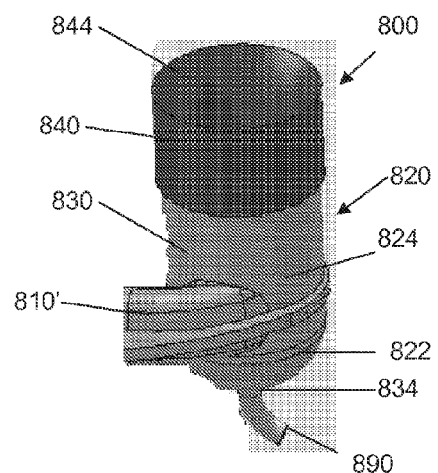
FIG. 9 illustrates an alternative particulate separator embodiment according to the invention.

Although the connection member 810 is depicted in, for example, FIGS. 3-5 as having an elbow when viewed from above, it should be understood from this disclosure that the connection member 810 may have a variety of approaches into the housing 820 including, for example, a more spiral (or arcing) approach than that illustrated or a straighter approach that could be less tangential. FIG. 9 provides an example of another shape for the connection member 810'. Additionally, the cross-section of the passageway 812 may have a variety of shapes including, for example, oval, circular (FIG. 1), and elliptical.

The housing 820 includes a discharge module 830 that is in fluid communication with the passageway 812 of the connection member 810. The discharge module 830 includes a discharge chamber 832 that further augments the spin and rotation of the water entering from the passageway 812 as the water moves upwards through the discharge chamber 832 towards the second discharge module 840 having a discharge chamber 842 in fluid communication with the discharge chamber 832. In at least one embodiment, this movement further assists in revitalizing the water and simulates rotational movement that occurs in flowing waterways in non-smooth natural beds.

The discharge chamber 832 includes a particulate discharge port 834 that connects to a conduit 890 (see, e.g., FIGS. 8 and 9) to remove the particulate that has precipitated out of the water during processing in at least the particulate module 830 and to route it away from the system in at least one embodiment. FIG. 7C illustrates an example of how the particulate discharge port 834 and the conduit 890 may be connected together.

Figure 6:
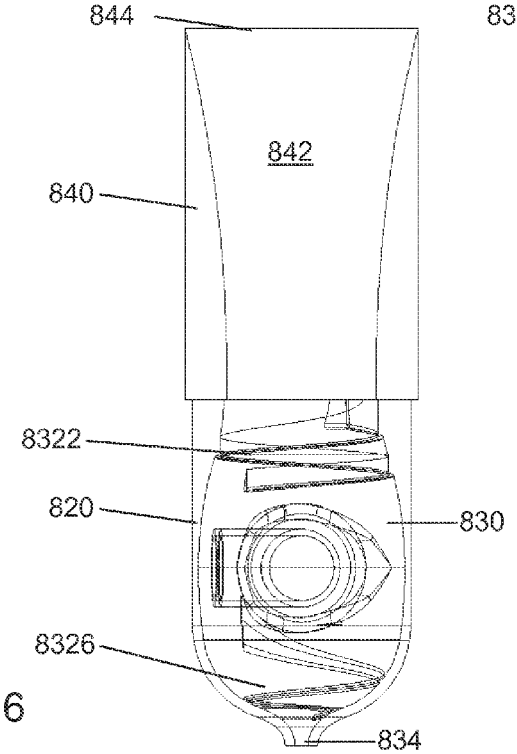

In at least one embodiment as illustrated, for example, in FIGS. 4-6, the discharge chamber 832 includes at least one spiraling protrusion 8322 that extends from just above (or proximate) the intake (or discharge port or junction between the passageway 812 and the discharge chamber 832) 8324 into the discharge chamber 832 up through or at least to the discharge outlet 844 to encourage additional rotation in the water prior to discharge. In at least one embodiment, the spiraling protrusion 8322 extends up through the discharge outlet 844. The spiraling protrusion 8322 in at least one embodiment spirals upward in a counterclockwise direction when viewed from above; however, based on this disclosure it should be appreciated that the direction of the spiral could be clockwise, for example, if these system were used in the southern hemisphere.

In at least one embodiment, the discharge chamber 832 includes at least one (second or particulate) spiraling protrusion 8326 that extends from just below and/or proximate to the intake 8324 down through the discharge chamber 832 towards the particulate discharge port 834 as illustrated, for example, in FIG. 6. When viewed from above, for example, in FIG. 4, the spiraling protrusion 8326 spirals in a counterclockwise direction; however, based on this disclosure it should be appreciated that the direction of the spiral could be clockwise, for example, if the system were used in the southern hemisphere. Based on this disclosure, it should be understood that one or both of the spiraling protrusions 8322, 8326 could be used in at least one embodiment. In an alternative embodiment to the above protrusion embodiments, the protrusions are replaced by grooves formed in the discharge chamber wall.

As illustrated, for example, in FIGS. 5 and 6, the discharge chamber's 832 diameter shrinks as it approaches the upper discharge chamber 842, which as illustrated includes a long radii expanding back out to decompress the discharged water for return to the storage tank or other water source. In an alternative embodiment, the long radii begins proximate to the intake 8324 in the discharge chamber 832. This structure in at least one embodiment provides for a convergence of the flow of water prior to a divergence back out of the flow of water.

FIG. 9 illustrates an example of the construction of the connection member 810' and the housing 820. The connection member 810' and the housing 820 are illustrated as being integrally formed. In at least one embodiment, the housing 820 includes a bottom part 822 and a middle part 824. The middle part 824 that includes the top parts of the connection member 810 and the discharge module 830. The bottom part 822 is attached to the middle part 824. The second discharge module 840 is illustrated as a separate part that fits on the top of the middle part 824 to establish fluid communication between the discharge chamber 832 and the discharge chamber 842. As discussed earlier in connection with the connection member 810, there are a variety of ways that the lower part 822, the middle part 824 and the second discharge module 840 may be fitted together including, for example, friction fit, connection members such as bolts or clamps particularly if matching flanges are present on the lower part 822 and the middle part 824, adhesive, mechanical structure such as threaded connection areas for connecting the second discharge module 840 to the middle part 824, etc. Based on this disclosure, it should be appreciated that a variety of parts could be used to assembly a particulate separator other than that illustrated in the figures and described, for example, in this paragraph.

Figure 7A:
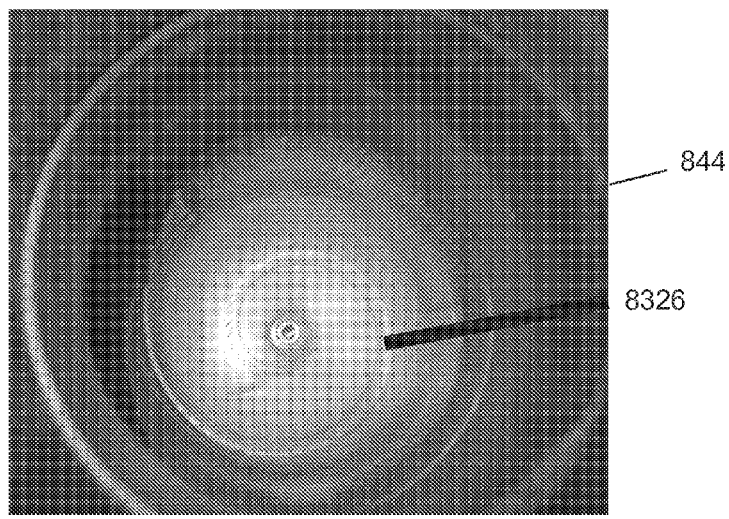
FIGS. 7A and 7B depict top views of an embodiment according to the invention.
Figure 7B:
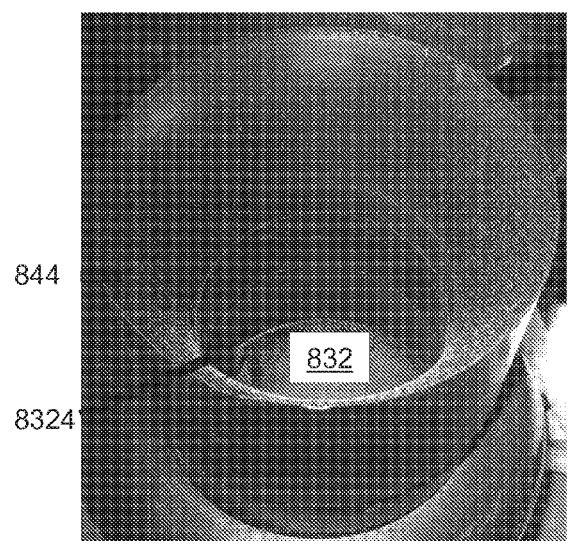
Figure 7C:
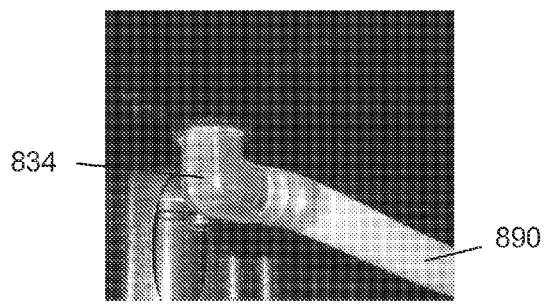
FIG. 7C depicts a side view of a connection point in an embodiment according to the invention.

FIGS. 7A and 7B are pictures taken looking into the discharge chamber 832 through the discharge outlet 844. FIG. 7A provides a nice view of the spiraling protrusion 8326 running down the discharge chamber 832 to the sediment discharge port 834.

Figure 10B:
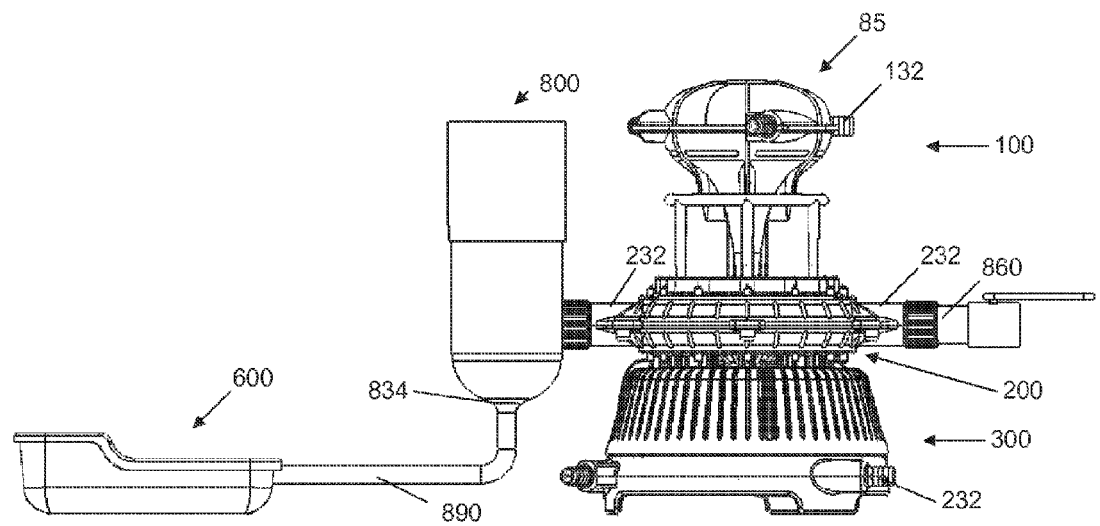

FIGS. 10A and 10B illustrate an example of how the particulate separator 800 would look when attached to a water treatment system 85. FIG. 10A illustrates a pair of views looking down on the combination while FIG. 10B is a side view. These figures also illustrate an example of how a supplement inlet 860 would look attached to a second discharge port 232 of the water treatment system and how the sediment container 600 would look attached to the particulate separator 800. Although these figures illustrate one particulate separator 800 attached to the water treatment system 85, it should be understood from this disclosure that both discharge ports 232 could be attached to a respective particulate separator 800. In a further embodiment, both particulate separators 800 could be attached to the same sediment container 600 through either a Y-connection point or two separate conduits 890 running into respective sediment containers 600. In another embodiment, each particulate separator 800 would have a separate sediment container 600. In a further embodiment, the sediment container 600 is view as an option for one or both particulate separators 800.

FIG. 11 illustrates another example particulate separator 800A that includes a taller second discharge module 840A that provides an advantage over the prior embodiments of dispensing the water into the water container at a point above the attached water system 85.

Based on this disclosure, it should be understood that the discharge chamber 842 may take a variety of other shapes than that illustrated in the figures (see, e.g., FIGS. 2, 5, 6, 7B, 9, and 11) that will still facilitate the movement of water up and through the discharge chamber 842. Further examples include cylindrical, hourglass, different forms of long radii, and/or combination of these examples. In at least one embodiment, the discharge chamber provides for a gradual expansion of the discharge chamber as it approaches the top to encourage movement outwards of the discharged water.

Figure 8:
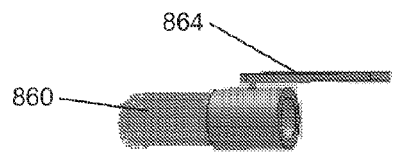
FIG. 8 illustrates a supplemental inlet embodiment according to the invention.

FIG. 8 illustrates an example of a supplemental inlet 860 for attachment to a discharge port 232 to augment the water present in the accumulation chamber beyond that provided through the disk-pack turbine. The supplemental inlet 860 includes a valve 864 to control the level of augmentation. Although the value 864 is illustrated as being a manual valve, it should be understood based on this disclosure that the valve could be electronically controlled in at least one embodiment through, for example, an electrical controller that also in at least one embodiment controls operation of the disk-pack turbine in the attached water system. In at least one embodiment, the supplemental valve can control the amount of supplemental fluid flow into the accumulation chamber. In at least one embodiment, the supplemental inlet 860 is attached to a discharge port 232 through, for example, press-fit, adhesive, screw engagement, and clamped engagement to establish a fluid pathway into the accumulation chamber from the supplemental inlet 860 when the valve is in at least a partially open position.

In a further embodiment, the supplemental valve and the discharge port housing are incorporated into the water treatment system having a vortex module 100, a disk-pack turbine module 200, and a motor/intake module 300 (although illustrated as being combined as one module, the motor and the intake could be separate modules). The vortex module 100 includes a vortex chamber with a plurality of intakes 132. The disk-pack turbine module 200 is as above-described. The motor/intake module 300 includes a motor that is rotational engagement with the disk-pack turbine and an intake chamber that is fed by an inlet and discharges the fluid out through a plurality of outlets 322 that feed respective inlets 132 of the vortex chamber. In at least one embodiment, the fluid flow from the intake chamber encourages the formation of a vortex in the vortex chamber. The previously mentioned U.S. patent application Ser. No. 13/213,614 published as U.S. Pat. No. 8,636,910 describes examples of water treatment systems that could be modified to incorporate the supplemental valve and/or the particulate separator, and this patent application is incorporated hereby reference for its teachings relating to water treatment systems. In further embodiments, the illustrated examples in the incorporated patent application are modified such that the discharge ports are angled into (or extend along a tangential or spiral curve away from) the accumulation chamber. In a further embodiment, the angle at which the discharge ports communicate with the accumulation chamber is substantially tangential to the rotational flow of fluid discharged from the disk-pack chambers.

In at least one embodiment the supplemental valve is used as a modification to a system without the particulate separator. In another embodiment the particulate separator is used as a modification to a system without the supplemental valve.

FIGS. 10A-14 illustrate different optional precipitate collection modules 600 having a precipitate collection container 620 according to the invention. FIGS. 10A-11 illustrate an example of a precipitate collection container 620 connected to a particulate separator 800, 800A; however, based on this disclosure it should be appreciated that the different precipitate collection modules 600 could be attached to the various embodiments discussed in this disclosure along with other water treatment systems having a precipitate discharge component. One of ordinary skill in the art should realize that the precipitate collection container 620 can take a variety of shapes and forms beyond that illustrated in FIGS. 10A-16B while still providing a cavity 622 to receive, for example, particulate, precipitated matter and/or concentrated solids or similar material and a screened discharge (or screen) 624 such as that illustrated on an exit port 626. In an alternative embodiment, the raised portion is a taller pipe structure (or riser) 626C extending up from the rest of the precipitate collection container 620C as illustrated, for example, in FIG. 15. In the illustrated embodiments of FIGS. 12-14, a screen 624 is included at least in part to allow for water to pass through while preventing the material from passing back out into the water being processed.

Figure 12:
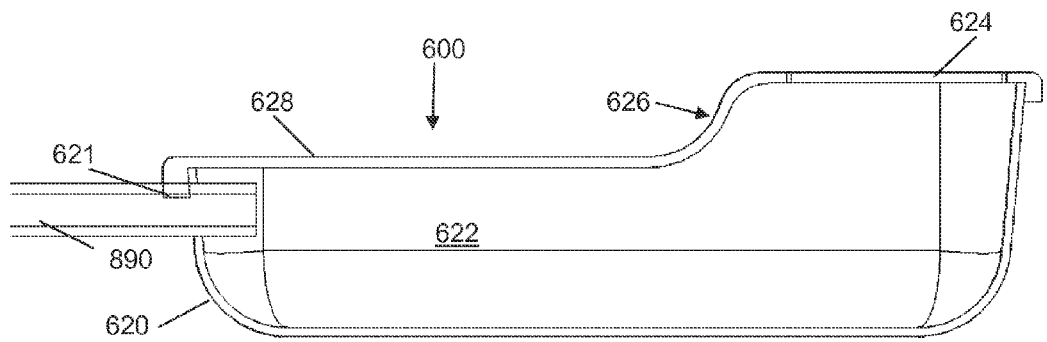
FIGS. 12-14 illustrate cross-sections taken at 12-12 in FIG. 10A of different particulate collection container embodiments according to the invention.
Figure 13:
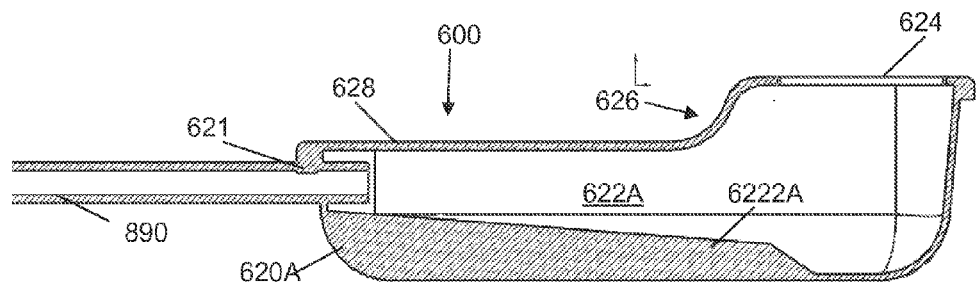
Figure 14:
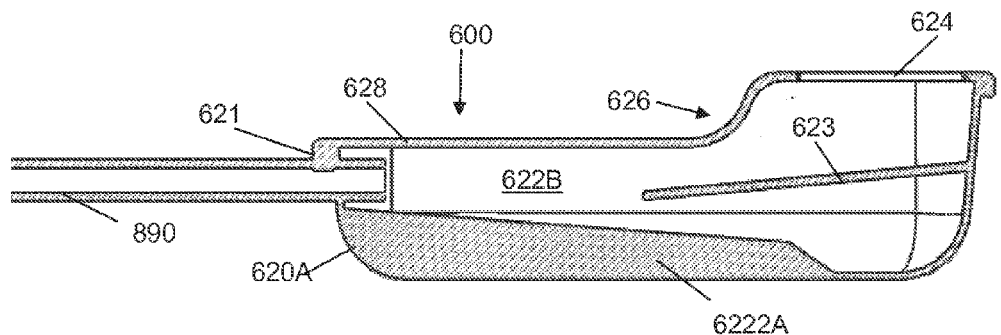

FIGS. 12-14 illustrate cross-sections of example embodiments for the precipitate collection container 620 where the cross-section is taken at 12-12 in FIG. 10A. FIGS. 12-14 illustrate an inlet 621 at the end of the precipitate collection container 620 opposite where the screen 624 and/or exit port 626 are located. Based on this disclosure, it should be appreciated that the exit port 626 extending above the cover 628 may be omitted. FIG. 12 illustrates the precipitate collection container 620 having an inlet 621 through which the conduit 592 attaches to provide a fluid pathway into the cavity 622 to allow for the accumulation of material in the bottom of the precipitate collection container 620 while water is allowed to exit from the precipitate collection container 620 through, for example, the screen 624 (illustrated as part of the exit port 626). Based on this disclosure, it should be understood that the conduit 592 (although shown as extending into the cavity 622) may instead have a connection point external to the cavity 622 such as through a hose connecter or other mechanical engagement. FIG. 12 also illustrates a further optional embodiment for the precipitate collection container 620 where the precipitate collection container includes a lid 628 that can be removed so that the collected material can be removed from the precipitate collection container 620. FIG. 13 illustrates another embodiment of the precipitate collection container 620A having a bottom 6222A of the cavity 622A with a slight gradient from the inlet 621 down towards the exit port 626. FIG. 14 illustrates the embodiment from FIG. 13 where the precipitate collection container 620B includes the addition of a screen projection (or wall) 623 extending from the wall opposite of the inlet 621 into the cavity 622B. The screen projection 623 although illustrated as extending at an angle, could instead be substantially horizontal. The screen projection 623 acts as a further barrier to the material escaping from the precipitate collection container 620.

Figure 15:
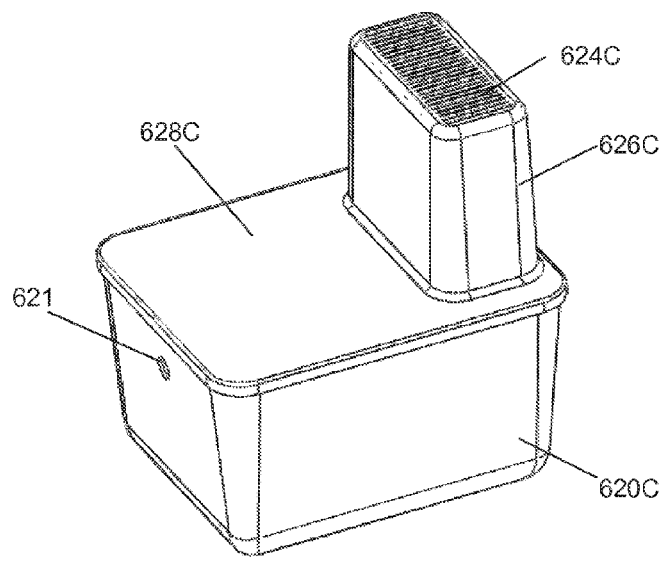
FIG. 15 illustrates a further precipitate collection container embodiment according to the invention.

FIG. 15 illustrates an alternative precipitate collection container 620C that includes an inlet 621 that can take the forms discussed above for the inlet. It should be appreciated that additional inlets could be added to accommodate additional conduits or alternatively the inlet could include a manifold attachment for connection to multiple conduits. The illustrated precipitate collection container 620C further includes a lid 628C on which is a riser 626C, which is an example of an exit port, with a screen 624C along its top surface to allow for the flow of water through the precipitate collection container 620C up through the riser 626C while the material is collected inside the device. The various internal configurations discussed for FIGS. 25-27 could also be present within the precipitate collection container 620C.

Figure 16A:
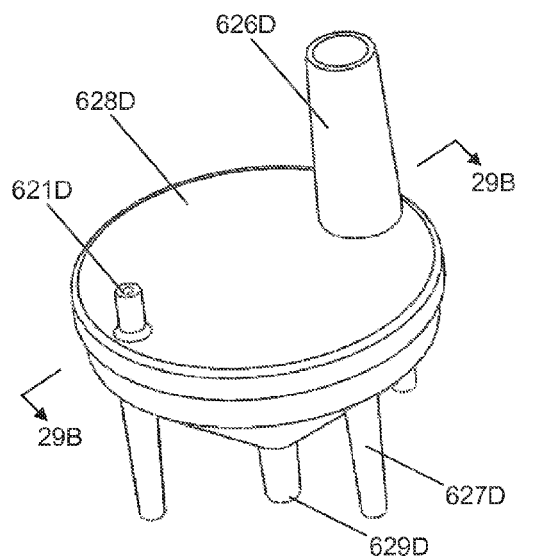
FIGS. 16A and 16B illustrate a further precipitate collection container embodiment according to the invention.
Figure 16B:
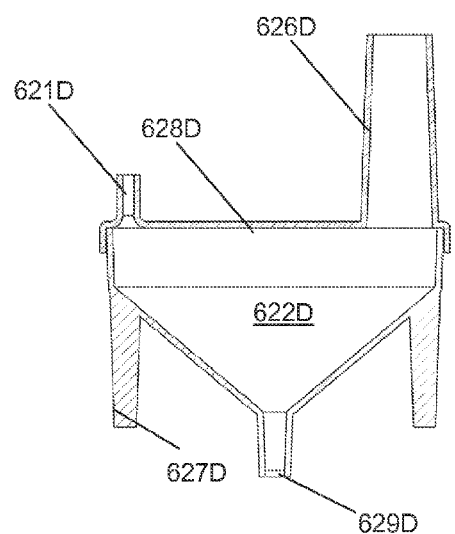

FIGS. 16A and 16B illustrate a funnel shaped precipitate collection container 620D with a whirlpool chamber 622D present within it. Like the previous embodiments, the precipitate collection container 620D includes an inlet 621D for connection to a conduit. It should be appreciated that additional inlets could be added to accommodate additional conduits or alternatively the inlet could include a manifold attachment for connection to multiple conduit. The illustrated precipitate collection container 620D includes a lid 628D on which a riser 626D extends up from to allow for the flow of water through the precipitate collection container 620D while the material is collected inside the device. The funnel shape of the cavity 622D with a particulate port 629D extending from the bottom of the cavity 6222D encourages the formation of a whirlpool, which will pull any material present in the cavity 6222D into a downward flow to drain out the particulate port into another cavity or out of the environment in which the system is running. In a further embodiment, the particulate port 629D includes a valve that can be open to drain any material that has collected in the cavity 6222D as part of a flush operation using the water present in the system to flush the material out of the particulate port 629D. In at least one embodiment, the particulate port 629D is designed to pass through the bottom of a container. In a further embodiment, there are multiple inlets and risers evenly spaced about the cover in an alternating pattern. In a still further embodiment, the inlets and/or risers are angled relative to the cover. FIGS. 16A and 16B also illustrate an alternative embodiment of the precipitate collection container 620D having a plurality of legs 627D to in part stabilize the precipitate collection container 620D against a surface.

In a further embodiment to the above precipitate collection container embodiments, a diffuser in fluid communication with the conduit is present within the cavity to spread the water and material coming into the cavity out from any direct stream of water and/or material that might otherwise exist. Examples of a diffuser are a structure that expands out from its input side to its output side, mesh or other large opening screen, and steel wool or other similar material with large pores.

In a further embodiment, the precipitate collection container would be replaced by a low flow zone formed in the environment from which the water is being pulled, for example a water tank.

FIGS. 17A-17C provide an illustration of a wing shim for use in the previously described embodiments or for use in water treatment systems. The illustrated wing shim includes a plurality of spacers 272N and a hexagonal support member 276M connecting them and providing alignment of the spacers 272N relative to the support member 276M and the disk 260N. The spacers 272N include a hexagonal opening passing through it to allow it to slide over the support member 276N. The disks 260N include a plurality of hexagonal openings 2602N. The support members 276N extend between the top and lower rotors and in at least one embodiment are attached to the rotors using screws or bolts. Based on this disclosure, one of ordinary skill in the art will appreciate that the cross-section of the support members may take different forms while still providing for alignment of the spacers 272N relative to the disks 260N based on the interplay of the openings and the cross-section of the support member.

In a further embodiment to at least one of the previously described embodiments or for use in water treatment systems, the disk-pack turbine includes a plurality of disks having waveforms present on them as illustrated in FIGS. 18A-19E. Although the illustrated waveforms are either concentric circles (FIGS. 18A and 18B) or biaxial (FIGS. 19A-19E), it should be understood that the waveforms could also be sinusoidal, biaxial sinucircular, a series of interconnected scallop shapes, a series of interconnected arcuate forms, hyperbolic, and/or multi-axial including combinations of these that when rotated provide progressive, disk channels with the waveforms being substantially centered about an expansion chamber. The shape of the individual disks defines the waveform, and one approach to creating these waveforms is to stamp the metal used to manufacture the disks to provide the desired shapes. Other examples of manufacture include machining, casting (cold or hot), injection molding, molded and centered, and/or electroplating of plastic disks of the individual disks. The illustrated waveform disks include a flange 2608, which may be omitted depending on the presence and/or the location of the wing shims, around their perimeter to provide a point of connection for wing shims 270 used to construct the particular disk-pack turbine. In a further embodiment, the wing shims 270 are located around and proximate to the expansion chamber in the disk turbine. In a further embodiment, the wing shims are omitted and replaced by, for example, stamped (or manufactured, molded or casted) features that provide a profile axially and/or peripherally for attachment to a neighboring disk or rotor.

In a variety of embodiments the disks have a thickness less than five millimeters, less than four millimeters, less than three millimeters, less than and/or equal to two millimeters, and less than and/or equal to one millimeter with the height of the disk chambers depending on the embodiment having approximately 1.3 mm, between 1.3 mm to 2.5 mm, of less than or at least 1.7 mm, between 1.0 mm and 1.8 mm, between 2.0 mm and 2.7 mm, approximately 2.3 mm, above 2.5 mm, and above at least 2.7 mm. Based on this disclosure it should be understood that a variety of other disk thickness and/or disk chamber heights are possible while still allowing for assembly of a disk-pack turbine for use in the illustrated systems and disk-pack turbines. In at least one embodiment, the height of the disk chambers is not uniform between two neighboring nested waveform disks. In a still further embodiment, the disk chamber height is variable during operation when the wing shims are located proximate to the center openings resulting, for example, from vibration in at least one embodiment.

Figure 18A:
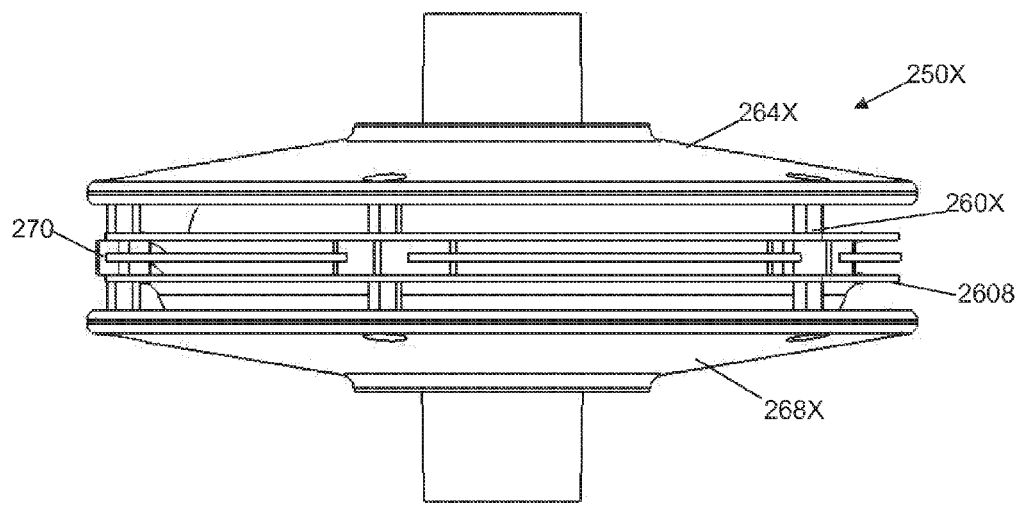
FIGS. 18A and 18B illustrate a waveform disk pack turbine example according to at least one embodiment of the invention.
Figure 18B:
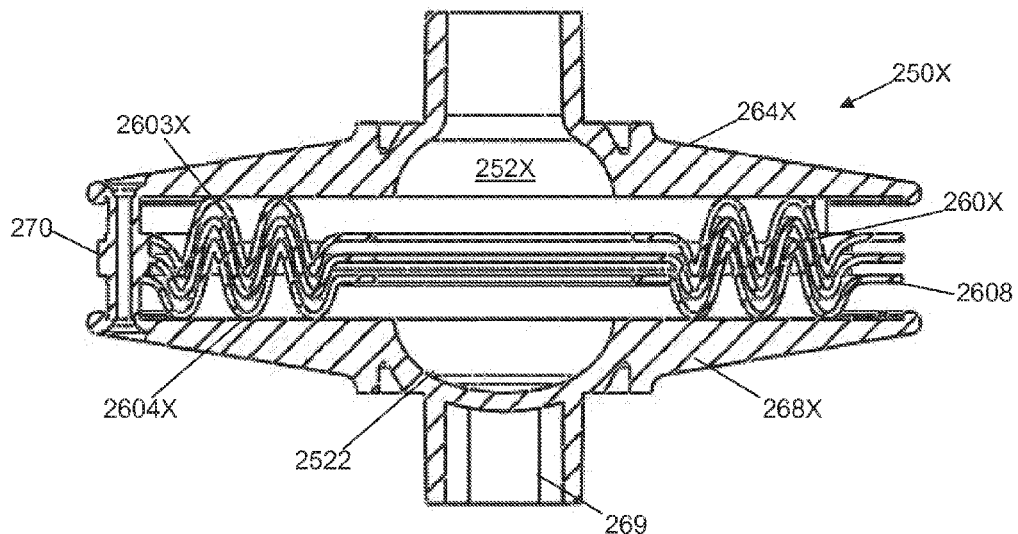
Figure 19A:
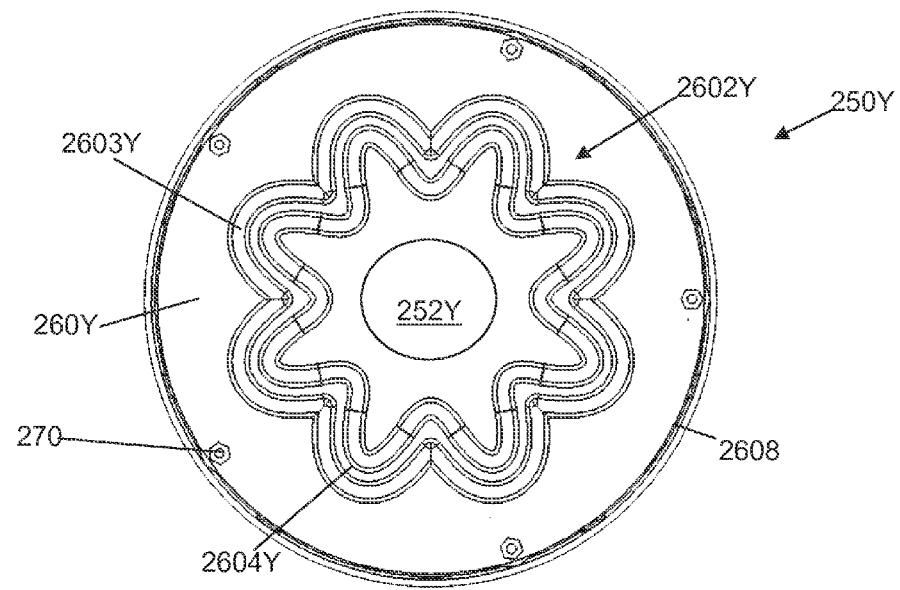
FIGS. 19A-19E illustrate a waveform disk pack turbine example according to at least one embodiment of the invention.
Figure 19B:
Figure 19C:
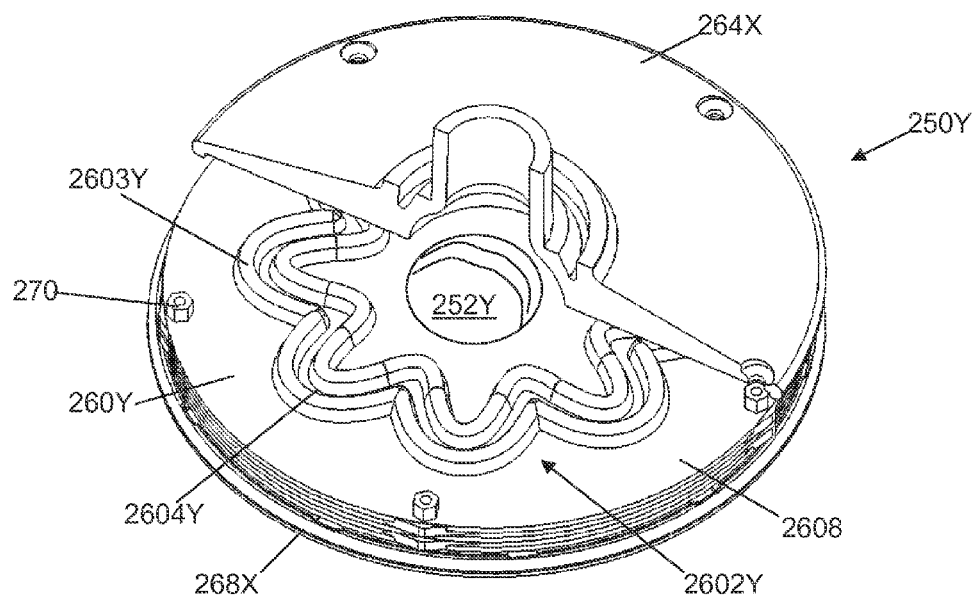
Figure 19D:
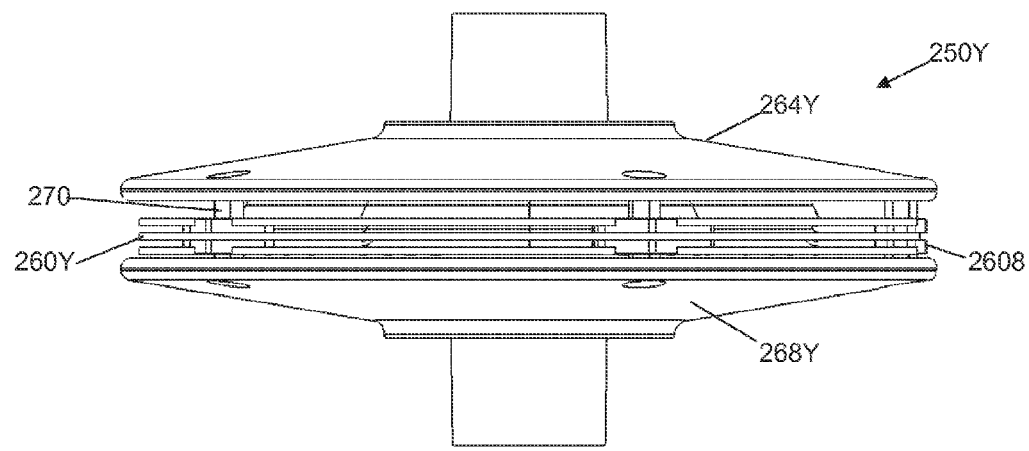
Figure 19E:
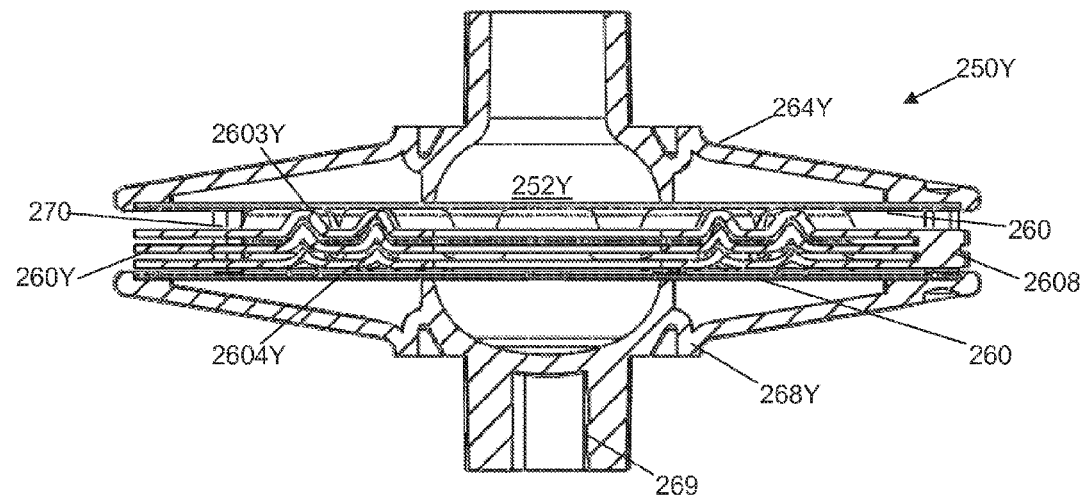

FIGS. 18A-19E illustrate respective disk-pack turbines 250X, 250Y that include an upper rotor 264X and a lower rotor 268X that have a substantially flat engagement surface (other than the expansion chamber elements) facing the area where the disks 260X, 260Y are present. In an alternative embodiment illustrated in FIG. 19E, the disk-pack turbine includes an upper rotor 264Y and a lower rotor 268Y with open areas between their periphery and the expansion chamber features to allow the waveforms to flow into the rotor cavity and thus allow for more disks to be stacked resulting in a higher density of waveform disks for the disk-pack turbine height with the omission of substantially flat disks 260 that are illustrated as being covers over the open areas of the rotors 264Y, 268Y. FIG. 19E also illustrates an alternative embodiment where there is a mixture of substantially flat disks 260 and nested waveform disks 260Y. FIGS. 18A-19E illustrate how the waveforms include descending thickness waves in each lower disk. In at least one embodiment, the waveforms are shallow enough to allow substantially the same sized waveforms on neighboring disks.

FIG. 18A illustrates a side view of an example of the circular waveform disk-pack turbine 250X. FIG. 18B illustrates a cross-section taken along a diameter of the disk-pack turbine 250X and shows a view of the disks 260X. Each circle waveform is centered about the expansion chamber 252X. The illustrated circle waveforms include two ridges 2603X and three valleys 2604X. Based on this disclosure, it should be appreciated that the number of ridges and valleys could be reversed along with be any number greater than one limited by their radial depth and the distance between the expansion chamber 250X and the flange 2608.

FIG. 19A illustrates a top view of a disk-pack turbine 250Y without the top rotor 264X to illustrate the biaxial waveform 2602Y, while FIGS. 19B-19E provide additional views of the disk-pack turbine 250Y. FIGS. 19A-19E provide an illustration of the waveforms rising above the disk while not dropping below the surface (or vice versa in an alternative embodiment). The illustrated biaxial waveform 2602Y that is illustrated as including two ridges 2603Y and one valley 2604Y centered about the expansion chamber 252Y. Based on this disclosure, it should be appreciated that the number of ridges and valleys could be reversed along with be any number greater than one limited by their radial depth and the distance between the expansion chamber 252Y and the flange 2608. FIG. 19B illustrates a side view of three waveform disks 260Y stacked together without the presence of wing shims 270 or the rotors 264X, 268X. FIG. 19C illustrates a partial cross-section of the disk-pack turbine 250Y. FIG. 19D illustrates a side view of the assembled disk-pack turbine 250Y. FIG. 19E illustrates a cross-section taken along a diameter of the disk-pack turbine 250X and shows a view of the disks 260Y.

A prototype using a discharge outlet built according to at least one embodiment of the invention as described in this patent application was placed into a tank having a capacity of at least 100 gallons and substantially filled to capacity with water, which caused the system to be completely submerged in water. The system was started up with submerged lights placed around and aimed at the discharge port to capture the images depicted in FIGS. 20A and 20B, which are both enlarged to the same amount and have light coming from the right side of the image. These images were captured from a slow-motion video taken with a macro lens. FIG. 20A shows the relative size of the vortical solitons that were discharged from the discharge outlet relative in size to an adult male's fingers. The vortical solitons spin and rotate about their centers as they move up and down within the water. The vortical solitons appear to be substantially flat vortex disc that are spinning and moving based on the captured video as represented in the images depicted in FIGS. 20A and 20B. The images include countless pairs of vortical solitons that upon discharge from the discharge outlet 232 wholly saturate the water within a contained environment with each soliton persisting until its energy is discharged via contact with a solid boundary or an obstruction. Although the water is saturated with these vortical packets of rotating energy, each maintains a relative distance of separation from its other soliton in the pair without collision with the other soliton. From review of the video, it appears that the soliton pairs move in complete lockstep with each other as they progress through the water environment while turning and spinning. It is believed that this restructuring of the water allows in part for it to impact the larger volume of water in which the system runs, because these vortical solitons will continue on their respective paths until interfered with by another object such as the wall of the container or other structural feature.

It should be noted that the present invention may, however, be embodied in many different forms and should not be construed as limited to the embodiments and prototype examples set forth herein; rather, the embodiments set forth herein are provided so that the disclosure will be thorough and complete, and will fully convey the scope of the invention to those skilled in the art. The accompanying drawings illustrate embodiment and prototype examples of the invention.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic. "Substantially" also is used to reflect the existence of manufacturing tolerances that exist for manufacturing components.

The foregoing description describes different components of embodiments being "in fluid communication" to other components. "In fluid communication" includes the ability for fluid to travel from one component/chamber to another component/chamber.

Based on this disclosure, one of ordinary skill in the art will appreciate that the use of "same", "identical" and other similar words are inclusive of differences that would arise during manufacturing to reflect typical tolerances for goods of this type.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

I claim:

1. A water treatment system comprising:
   a motor;
   a driveshaft engaging said motor;
   a vortex module having
      a housing,
      a plurality of inlets spaced around the periphery of the housing near a top of said housing, and
      a vortex chamber formed in said housing and in fluid communication with said plurality of inlets;
   a disk-pack module having
      a disk-pack housing having an accumulation chamber formed in said disk-pack housing, and said accumulation chamber having a plurality of discharge ports providing a fluid pathway from said accumulation chamber to outside of said disk-pack housing, and
      a disk-pack having an expansion chamber formed in an axial center and in fluid communication with said vortex chamber, said disk-pack having a plurality of spaced apart disks providing chambers between them to form a plurality of passageways between said expansion chamber and said accumulation chamber, said disk-pack engaging said driveshaft; and
   a particulate separator including
      a connection member having a passageway capable of being in fluid communication with the discharge port,
      a discharge module having
         a discharge chamber in fluid communication with said passageway, and
         a particulate discharge port in fluid communication with said discharge chamber.

2. The system according to claim 1, further comprising an intake module including
   an intake housing with at least one intake opening passing through it into an intake chamber formed in said intake housing, and
   a plurality of ports in fluid communication with said intake chamber, each of said plurality of ports is in fluid communication with one inlet of said vortex module.

3. The system according to claim 1, wherein said particulate separator further includes a second discharge module having at least one of
   a second discharge chamber in fluid communication with said discharge chamber, and
   a discharge outlet in fluid communication with said second discharge chamber.

4. The system according to claim 3, wherein said second discharge module rises above a height of said vortex module.

5. The system according to claim 1, wherein said discharge module includes at least one spiraling protrusion along a surface of said discharge chamber running from a junction of said passageway and said discharge chamber.

6. The system according to claim 5, wherein said spiraling protrusion runs in a downwardly direction towards said particulate discharge outlet.

7. The system according to claim 5, wherein said spiraling protrusion runs in an upwardly direction towards the discharge outlet.

8. The system according to claim 5, wherein
said particulate separator further includes a second discharge module having at least one of
   a second discharge chamber in fluid communication with said discharge chamber, and said spiraling protrusion runs along a surface of said second discharge chamber, and
   a discharge outlet in fluid communication with said second discharge chamber.

9. The system according to claim 5, wherein at least one of said at least one spiraling protrusion spirals in a counterclockwise direction when viewed from above.

10. The system according to claim 5, wherein at least one of said at least one spiraling protrusion spirals in a clockwise direction when viewed from above.

11. The system according to claim 1, wherein said connection member is adapted to attach to the device to provide a smooth fluid flow from the discharge port to said passageway.

12. The system according to claim 1, further comprising a supplementary inlet capable of attaching to a second discharge port of the device.

13. The system according to claim 12, wherein said supplementary inlet includes
   an inlet passageway, and
   a valve within said inlet passageway to control a flow of fluid through said inlet passageway.

14. The system according to claim 12, wherein said supplementary inlet includes an electrically controlled valve.

15. A water treatment system comprising:
   a motor;
   a vortex module having a housing and a vortex chamber formed in said housing and in fluid communication with a plurality of inlets;
   a disk-pack module having
      a disk-pack housing having an accumulation chamber formed in said disk-pack housing, and said accumulation chamber having at least one discharge port providing a fluid pathway from said accumulation chamber to outside of said disk-pack housing, and
      a disk-pack having an expansion chamber formed in an axial center and in fluid communication with said vortex chamber, said disk-pack having a plurality of spaced apart disks providing chambers between them to form a plurality of passageways between said expansion chamber and said accumulation chamber, said disk-pack connected to said motor; and
   a particulate separator including
      a connection member having a passageway capable of being in fluid communication with the discharge port,
      a discharge module having
         a discharge chamber in fluid communication with said passageway, and
         a particulate discharge port in fluid communication with said discharge chamber.

16. The system according to claim 15, wherein said particulate separator further includes a second discharge module having at least one of
   a second discharge chamber in fluid communication with said discharge chamber, and
   a discharge outlet in fluid communication with said second discharge chamber.

17. The system according to claim 16, wherein said second discharge module rises above a height of said vortex module.

18. The system according to claim 16, wherein said discharge module includes at least one spiraling protrusion along a surface of said discharge chamber running from a junction of said passageway and said discharge chamber.

19. The system according to claim 18, wherein said spiraling protrusion runs in at least one of a downwardly direction towards said particulate discharge outlet and an upwardly direction towards the discharge outlet.

20. The system according to claim 15, wherein said connection member is adapted to attach to the device to provide a smooth fluid flow from the discharge port to said passageway.

* * * * *